(12) United States Patent
Yu et al.

(10) Patent No.: US 6,494,943 B1
(45) Date of Patent: Dec. 17, 2002

(54) INK JET INKS, INKS, AND OTHER COMPOSITIONS CONTAINING COLORED PIGMENTS

(75) Inventors: Yuan Yu, Nashua, NH (US); Friedrich K. von Gottberg, Cambridge, MA (US); Robert M. Amici, Berlin, MA (US); Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/698,468

(22) Filed: Oct. 27, 2000

Related U.S. Application Data

(60) Provisional application No. 60/161,960, filed on Oct. 28, 1999.

(51) Int. Cl.$^7$ .................... C09D 11/00; C09B 67/50; C09C 1/04; C04B 14/04
(52) U.S. Cl. .............. 106/31.65; 106/412; 106/415; 106/419; 106/494; 106/495; 106/496; 106/497; 106/498; 106/484; 106/432; 106/436; 106/450; 106/452; 106/453; 106/455; 106/461; 106/479; 106/480; 106/485
(58) Field of Search .................. 106/31.65, 412, 106/415, 419, 432, 436, 450, 452, 453, 455, 461, 479, 480, 484, 485, 493, 494, 495, 496, 497, 498

(56) References Cited

U.S. PATENT DOCUMENTS

| | | | |
|---|---|---|---|
| 2,833,736 A | 5/1958 | Glasser ..................... | 260/29.6 |
| 3,607,813 A | 9/1971 | Purcell et al. ............. | 260/29.6 |
| 4,104,833 A | 8/1978 | Glowacki .................. | 51/281 R |
| 4,692,481 A | 9/1987 | Kelly ........................ | 523/219 |
| 4,770,706 A | 9/1988 | Pietsch ...................... | 106/24 |
| 5,026,427 A | 6/1991 | Mitchell et al. ............. | 106/23 |
| 5,026,755 A | 6/1991 | Kveglis et al. ............. | 524/389 |
| 5,051,464 A | 9/1991 | Johnson et al. ............. | 524/555 |

(List continued on next page.)

FOREIGN PATENT DOCUMENTS

| | | | | |
|---|---|---|---|---|
| EP | 0 475 075 A1 | 3/1992 | ........... | C09D/11/00 |
| EP | 0 677 556 A2 | 10/1995 | ........... | C09B/67/08 |
| EP | 0 688 836 A2 | 12/1995 | ........... | C09D/11/02 |
| EP | 0 839 883 | 5/1998 | ........... | C09D/11/00 |
| GB | 2 330 842 A | 5/1999 | ........... | C09B/67/54 |
| JP | 56-147865 | 11/1981 | ........... | C09D/11/00 |
| JP | 57-21466 | 2/1982 | ........... | C09D/11/00 |
| JP | 64-48875 | 2/1989 | ........... | C09D/11/16 |
| JP | 1992216940 | 12/1990 | | |
| JP | 1989102935 | 9/1993 | | |
| JP | 1990147836 | 9/1993 | | |
| JP | 1998028156 | 1/1998 | | |
| JP | 1998213010 | 5/1998 | | |
| WO | WO 96/18688 | 6/1996 | ............. | C09C/1/56 |
| WO | WO 96/18690 | 6/1996 | ............. | C09C/1/56 |
| WO | WO 97/47697 | 12/1997 | ........... | C09D/11/00 |
| WO | WO 97/47699 | 12/1997 | ........... | C09D/11/00 |
| WO | WO 97/48769 | 12/1997 | ........... | C09B/67/22 |
| WO | WO 98/44058 | 10/1998 | ........... | C09D/11/00 |
| WO | WO 99/31175 | 6/1999 | ............ | C08K/9/04 |
| WO | WO 99/38921 | 8/1999 | ............. | C09C/1/56 |
| WO | WO 99/51690 | 10/1999 | ........... | C09B/69/00 |
| WO | WO 00/22051 | 4/2000 | ............. | C09C/1/56 |
| WO | WO 00/52102 | 9/2000 | ........... | C09B/67/00 |
| WO | WO 00/63306 | 10/2000 | ........... | C09D/11/00 |
| WO | WO 01/10963 | 2/2001 | ........... | C09D/11/00 |
| WO | WO 01/25340 | 4/2001 | ........... | C09B/67/20 |

OTHER PUBLICATIONS

U.S. Provisional application No. 60/157,284, converted to 09/672,328, filed Sep. 29, 2000.

Oleg V. Kozyuk, "Use of hydrodynamic cavitation for emulsifying and homogenizing processes," American Laboratory News, Jun. 1999.

Article, CavilPro™ 300 Ultra High–Shear Processor, Five Star Technologies, No date available.

International Search Report for International patent application No. PCT/US00/29883, mailed Mar. 16, 2001.

International Search Report for International patent application No. PCT/US00/29882, mailed Mar. 1, 2001.

JP11246806 A to Toyo Ink Mfg. Co. Ltd.—Abstract Only. (From Patent Abstracts of Japan, vol. 1999, No. 14, Dec. 22, 1999).

JP11080636 A to Canon Inc.—Abstract Only. (From Patent Abstracts of Japan, vol. 1999, No. 08, Jun. 30, 1999).

JP11256066 A to Tokai Carbon Co. Ltd.—Abstract only. (From Patent Abstracts of Japan, vol. 1999, No. 14, Dec. 22, 1999).

*Primary Examiner*—Helene Klemanski
*Assistant Examiner*—Veronica F. Faison

(57) ABSTRACT

Colored pigments having one or more desired parameters and/or properties are described. These parameters and/or properties include: a) a particles size of from about 10 nm to about 300 nm; b) an accusizer number of less than $10^{10}$ particles/ml of dispersion at 15% solids which are greater than 0.5 micron; c) a filterability such that when in a liquid medium, 100 ml having 10% solids of the colored pigment filters through a 3 micron nylon absolute filter; d) a colored pigment purity of greater than about 80%, based on extractable material; and/or e) a stability such that the above-described properties do not change by more than 50% at 25 degrees C. for at least one week. Colored pigments having at least one organic group and having one or more of the above-described characteristics is also described as well as a process for preparing surface-modified colored pigments. The process involves combining at least one treating agent and at least one type of colored pigment(s) in a container to form a mixture and subjecting the mixture to high shearing and introducing at least one diazotizing agent to the mixture at least for a portion of time while the high shearing is taking place, and preferably during the entire time that high shearing is taking place, such that a reaction product is formed and contains surface-modified colored pigment(s).

16 Claims, No Drawings

U.S. PATENT DOCUMENTS

| | | | |
|---|---|---|---|
| 5,204,404 A | 4/1993 | Werner, Jr. et al. | 524/501 |
| 5,266,361 A | 11/1993 | Schwarte et al. | 427/407.1 |
| 5,266,406 A | 11/1993 | Den Hartog et al. | 428/423.1 |
| 5,275,900 A | 1/1994 | Ong et al. | 430/106 |
| 5,278,018 A | 1/1994 | Young et al. | 430/110 |
| 5,281,261 A | 1/1994 | Lin et al. | 106/20 R |
| 5,319,044 A | 6/1994 | Jung et al. | 526/279 |
| 5,356,973 A | 10/1994 | Talijan et al. | 524/314 |
| 5,418,277 A | 5/1995 | Ma et al. | 524/520 |
| 5,484,575 A | 1/1996 | Steenackers | 422/176 |
| 5,493,971 A | 2/1996 | Lewis et al. | 101/454 |
| 5,510,221 A | 4/1996 | Matalevich et al. | 430/106.6 |
| 5,554,739 A * | 9/1996 | Belmont | 534/885 |
| 5,571,311 A | 11/1996 | Belmont et al. | 106/20 R |
| 5,572,311 A | 11/1996 | Abe et al. | 399/127 |
| 5,630,868 A | 5/1997 | Belmont et al. | 106/31.75 |
| 5,672,198 A * | 9/1997 | Belmont | 106/476 |
| 5,679,138 A | 10/1997 | Bishop et al. | 106/20 |
| 5,698,016 A | 12/1997 | Adams et al. | 106/316 |
| 5,707,432 A | 1/1998 | Adams et al. | 106/31.6 |
| 5,713,988 A | 2/1998 | Belmont et al. | 106/31.6 |
| 5,803,959 A | 9/1998 | Johnson et al. | 106/31.75 |
| 5,810,052 A | 9/1998 | Kozyuk | 138/37 |
| 5,837,045 A * | 11/1998 | Johnson et al. | 106/31.85 |
| 5,851,280 A | 12/1998 | Belmont et al. | 106/472 |
| 5,885,335 A | 3/1999 | Adams et al. | 106/316 |
| 5,895,522 A | 4/1999 | Belmont et al. | 106/31.6 |
| 5,900,029 A | 5/1999 | Belmont et al. | 8/550 |
| 5,922,118 A * | 7/1999 | Johnson et al. | 106/31.6 |
| 5,931,771 A | 8/1999 | Kozyuk | 516/53 |
| 5,937,906 A | 8/1999 | Kozyuk | 138/37 |
| 5,955,232 A | 9/1999 | Little et al. | 430/106 |
| 5,958,999 A | 9/1999 | Bates et al. | 523/161 |
| 5,968,243 A | 10/1999 | Belmont et al. | 106/31.65 |
| 5,969,207 A | 10/1999 | Kozyuk | 585/921 |
| 5,971,601 A | 10/1999 | Kozyuk | 366/176.1 |
| 5,976,232 A | 11/1999 | Gore | 106/31.65 |
| 6,012,492 A | 1/2000 | Kozyuk | 138/37 |
| 6,024,786 A | 2/2000 | Gore | 106/31.65 |
| 6,042,643 A | 3/2000 | Belmont et al. | 106/472 |
| 6,328,894 B1 * | 12/2001 | Chan et al. | 106/31.65 |

* cited by examiner

INK JET INKS, INKS, AND OTHER COMPOSITIONS CONTAINING COLORED PIGMENTS

This application claims the benefit under 35 U.S.C. §119(e) of prior U.S. Provisional Application No. 60/161,960 filed Oct. 28, 1999, which is incorporated in its entirety by reference herein.

BACKGROUND OF THE INVENTION

The present invention relates to colored pigments and aqueous and non-aqueous compositions containing the same. The present invention further relates to methods of preparing colored pigments and their use in a variety of applications, including inks, such as ink jet inks and the like.

The use of colored pigments in the industry has gained wide acceptance in a number of applications. Generally, the particle size of available colored pigments has hindered efforts to improve products containing colored pigments. Currently, the only satisfactory way to make colored pigments having small particle sizes has been with the use of a dispersant, such as surfactants and polymeric resins. However, while the colored pigments having the small particle sizes can be made, these colored particles are only stable with the aid of the dispersant, and if the dispersant is substantially removed, the colored pigments will agglomerate and thus lose their small particle size. The need for the dispersant to be always present has, however, prevented or hindered the use of colored pigments in many applications, since the presence of the dispersant must be taken into account when formulating compositions, such as inks. Other problems associated with the use of dispersant include: dispersants can be incompatible with other ink components, the dispersants must be used in large quantities, and the inks with surfactants generally has low surface tension.

Also, aqueous systems are increasingly being used in many applications such as automotive and industrial coatings, paints, papers, inks, toners, adhesives, latexes, etc. as manufacturers face increased pressure to replace conventional solvent based systems. Such aqueous systems are known and generally contain a colorant, such as a dye, which is soluble in the aqueous vehicle, such as water or a mixture of water and a water-soluble or water-miscible organic solvent.

Although dye-based compositions are readily utilized, dyes have several disadvantages when used in aqueous ink systems. For example, dyes, being water-soluble in a water/organic mixture, may dissolve and run when exposed to moisture or water. Dye images may further smear or rub off on contact with felt pen markers or upon being rubbed or touched by a finger. Dyes also exhibit poor light stability when exposed to visible or ultraviolet light.

Pigments are also known as colorants in aqueous compositions but have not received a wide degree of acceptance in aqueous systems, such as ink jet inks, because of problems associated with the performance and reliability of the composition, i.e., print properties, stability, latency, and the like. Examples of such pigments include carbon black, titanium dioxide white, cobalt blue ($CoO—Al_2O_3$), phthalocyanine blue, phthalocyanine green, and chrome yellow ($PbCrO_4$).

U.S. Pat. No. 5,837,045, to Johnson et al. describes novel surface-modified colored pigments and aqueous compositions containing such surface-modified colored pigments. Although such surface-modified colored pigments are a considerable improvement over dye-based or traditional pigment systems (i.e. pigments requiring stabilization with polymer or surfactant compositions), a continuing need exists for improved surface-modified colored pigments and processes for making the same, as well as aqueous or solvent based compositions containing such surface-modified colored pigments, especially for use in ink compositions which require long term colloidal stability and lightfastness. It is also desirable to produce improved aqueous ink compositions which exhibit improved latency and recoverability in their respective printing systems while providing good print properties. A further need exists for improved colored pigments and ink compositions which contain the colored pigments.

SUMMARY OF THE INVENTION

The present invention relates to colored pigments having one or more desired parameters and/or properties without the addition of dispersants. These parameters and/or properties include:

a particle size distribution of from about 10 nm to about 300 nm;

an accusizer number of less than $10^{10}$ particle/ml of dispersion (at 15% solids) which are greater than 0.5 micron;

a filterability such that when in a liquid medium, 100 ml with 10% solids of the colored pigment filters through a 3 micron nylon absolute filter;

a colored pigment purity of greater than about 80%, based on extractable material; and/or a stability such that the above-described properties do not change by more than 50% at 25 degrees C. for 1 week.

The above-described colored pigment is preferably in an aqueous or non-aqueous media having no external dispersant present.

The present invention further relates to a colored pigment having attached at least one organic group and having one or more of the above-described characteristics.

In addition, the present invention relates to a process for preparing surface-modified colored pigments. The process involves combining at least one treating agent and at least one type of colored pigment in a container to form a mixture and subjecting the mixture to high shearing and introducing at least one diazotizing agent to the mixture at least for a portion of time while the high shearing is taking place, and preferably while the entire high shearing is taking place, such that a reaction product is formed and contains surface-modified colored pigment(s). The treating agent has an organic group which comprises at least one diazotizable group. In a preferred embodiment, the diazotizable group comprises a) at least one aromatic group, at least one $C_1–C_{20}$ alkyl group, or mixtures thereof; and b) at least one ionic group, ionizable group, nonionic group, or mixtures thereof. Preferably, in this process, the product yield results in from about 30% to about 100% of the colored pigment having a particle size of from about 10 nm to about 300 nm.

The present invention is further directed to a process for preparing ink compositions incorporating the colored pigments described above.

The colored pigments prepared by the process of the present invention may be used in aqueous or solvent based compositions containing conventional pigments. Such compositions include, for example, automotive and industrial coatings, paints, papers, toners, inks (particularly, ink jet ink compositions), adhesives, latexes, textiles and fibers. The colored pigments may be tailored to provide compatibility with the particular aqueous or solvent based system and provide easier, more complete dispersion, improved colloidal stability and greater color intensity and shades.

DETAILED DESCRIPTION OF THE PRESENT INVENTION

The present invention relates to colored pigments having one or more desired characteristics and methods of making these colored pigments, as well as their use in a variety of applications. The colored pigments of the present invention can be characterized such that the colored pigments have at least one of the following characteristics wherein an aqueous or non-aqueous media:

a) a particle size distribution of from about 10 nm to about 300 nm;

b) an accusizer number of less than $10^{10}$ particle/ml of dispersion (at 15% solids) which are greater than 0.5 micron;

c) a filterability such that when in a liquid medium, 100 ml with 10% solids of the colored pigment filters through a 3 micron nylon absolute filter;

d) a colored pigment purity of greater than about 80%, based on extractable material; and/or e) a stability such that the above-described properties do not change by more than 50% at 25 degrees C.

The above-described colored pigment preferably has one or more of the above characteristics when present in an aqueous or non-aqueous media having no added external dispersant present.

The pigment can be, but is not limited to, pigments traditionally used in ink compositions (including inkjet ink compositions), coating compositions (including paint formulations), liquid and solid toners, films, plastics, rubbers, and the like. Examples include, but are not limited to, black pigments (e.g., carbon products like carbon black) and other colored pigments (e.g., polymeric and organic pigments). Preferably, the colored pigments of the present invention are colors other than black.

The desired colored pigment may be chosen from a wide range of conventional colored pigments. The colored pigment can be blue, black, brown, cyan, green, white, violet, magenta, red, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation. Examples of other suitable colored pigments are described in the *Colour Index*, 3rd edition (The Society of Dyers and Colourists, 1982). The color pigment will typically have a wide range of BET surface areas, as measured by nitrogen adsorption.

With respect to the above-described characteristics, the colored pigments of the present invention have at least one of the characteristics, and more preferably, have at least two of the characteristics, and even more preferably have at least three, four, or five of the characteristics, and most preferably have all of the characteristics.

With respect to the particle size of the colored pigments, the particle size distribution is based on the mean volume diameter of the pigment particles as measured by the dynamic light scattering method. The particle size distribution range of the colored pigments of the present invention is from about 10 nm to about 300 nm, and preferably is from about 10 nm to about 200 nm, more preferably is from about 20 nm to about 150 nm, and most preferably is from about 50 nm to about 100 nm.

With respect to the accusizer number, this number is a measurement of the number of particles having a certain size or greater in a dispersion at a certain % of solids. In the present invention, the colored pigments of the present invention, when in a dispersion or liquid medium, have an accusizer number of less than $10^{10}$ particle/ml dispersion which are greater than 0.5 micron with a dispersion having 15% solids. Preferably, the accusizer number is $10^9$, and more preferably is $10^8$ or less.

With respect to filterability of the colored pigments of the present invention, the colored pigments, when in 100 ml dispersion having 10% solids, filter completely through a 3 micron nylon absolute filter. More preferably, the same dispersion completely filters through a 1 to 2 micron nylon absolute filter.

The purity level of the colored pigments is preferably at least about 80% and more preferably is from about 85% to about 100%, and most preferably is from about 90% to about 100%. The purity level is based on the amount of material by weight that is non-extractable. The purity level reflects the amount of colored pigment present without impurities including non-pigment material. For purposes of the present invention, a dispersant is considered extractable material. The purity level of the colored pigments is preferably based on colored pigments having a particle size range of from about 10 nm to about 200 nm.

The colored pigments of the present invention can also be characterized by their stability. In particular, the colored pigments are stable such that the above-described characteristics do not change more than 50%, and more preferably do not change by more than 20%, and most preferably do not change by more than 10% at 25 degrees C. for 1 week and more preferably for 1 month.

As stated earlier, the colored pigments of the present invention have one or more of the above-described characteristics.

Using the preferred process to make the colored pigment of the present invention, a product yield of from about 30% to about 100% of the colored pigments of the present invention can be obtained which preferably have a particle size of about 100 nm. More preferably, from about 50% to about 100%, and most preferably from about 70% to about 100% of the colored pigments of the present invention have a particle size of about 100 nm. The preferred process to make the colored pigments has the ability to yield colored pigments having large percentages of certain particle sizes, which is highly desired.

The colored pigment(s) of the present invention is preferably a colored pigment having attached at least one organic group and having one or more of the above-described characteristics. The organic group contains a) at least one aromatic group, at least one $C_1$–$C_{20}$ alkyl group, or mixtures thereof; and preferably further contains b) at least one ionic group, ionizable group, nonionic group, or mixtures thereof.

At least one aromatic group includes, but is not limited to, unsaturated cyclic hydrocarbons containing one or more rings and may be substituted or unsubstituted, for example with alkyl groups. Aromatic groups include aryl groups (for example, phenyl, naphthyl, anthracenyl, and the like) and heteroaryl groups (for example, imidazolyl, pyrazolyl, pyridinyl, thienyl, thiazolyl, furyl, triazinyl, indolyl, and the like). At least one $C_1$–$C_{20}$ alkyl group may be branched or unbranched, substituted or unsubstituted.

A preferred set of organic groups which may be used are organic groups substituted with an ionic group, an ionizable group or an nonionic group as a functional group. An ionizable group is one capable of forming an ionic group in the medium of use. The ionic group may be an anionic group or a cationic group and the ionizable group may form an anion or cation. The nonionic group is a group which does not possess or is not capable of possessing a charge.

Ionizable functional groups forming anions or anionic groups include, for example, acidic groups or salts of acidic groups. The organic groups, therefore, include groups derived from organic acids. Preferably, when an organic group contains an ionizable group forming an anion, such an organic group has a) an aromatic group or a $C_1$–$C_{20}$ alkyl group and b) at least one acidic group having a $pK_a$ of less than 11, or at least one salt of an acidic group having a $pK_a$ of less than 11, or a mixture of at least one acidic group having a $pK_a$ of less than 11 and at least one salt of an acidic group having a $pK_a$ of less than 11. The $pK_a$ of the acidic group refers to the $pK_a$ of the organic group as a whole, not just the acidic substituent. More preferably, the $pK_a$ is less than 10 and most preferably less than 9. Preferably, the aromatic group of the organic group is directly attached to the colored pigment. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Most preferably, the organic group is a substituted or unsubstituted sulfophenyl group or a salt thereof; a substituted or unsubstituted carboxyphenyl; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof.

Examples of organic groups that are anionic in nature include, but are not limited to, —$C_6H_4$—$COO^-X^+$; —$C_6H_4$—$SO_3^-X^+$; —$C_6H_4$—$(PO_3)^{-2}2X^+$; —$C_6H_2$—$(COO^-X^+)_3$; —$C_6H_3$—$(COO^-X^+)_2$; —$(CH_2)_z$—$(COO^-X^+)$; —$C_6H_4$ —$(CH_2)_z$—$(COO^-X^+)$, wherein $X^+$ is any cation such as $Na^+$, $H^+$, $K^+$, $NH_4^+$, $Li^+$, $Ca^{2+}$, $Mg^{2+}$ and the like and z is an integer from 1 to 18. As recognized by those skilled in the art, $X^+$ may be formed in-situ as part of the manufacturing process or may be associated with the aromatic or alkyl group through a typical salt swap or ion-exchange process.

Amines represent examples of ionizable functional groups that form cations or cationic groups and may be attached to the same groups as discussed above for the ionizable groups which form anions. For example, amines may be protonated to form ammonium groups in acidic media. Preferably, an organic group having an amine substituent has a $pK_b$ of less than 5. Quaternary ammonium groups (—$NR_3^+$), quaternary phosphonium groups (—$PR_3^+$) and sulfonium groups (—$SR_2^+$) also represent examples of cationic groups. Preferably, the organic group contains an aromatic group such as a phenyl or a naphthyl group and a quaternary ammonium or a quaternary phosphonium or sulfonium group. Quaternized cyclic amines, and even quaternized aromatic amines, can also be used as the organic group. Thus, N-substituted pyridinium compounds, such as N-methyl-pyridyl, can be used in this regard.

Examples of organic groups that are cationic in nature include, but are not limited to, —$C_6H_4N(CH_3)_3^+Y^-$, —$C_6H_4COCH_2N(CH_3)_3^+Y^-$, —$C_6H_4(NC_5H_5)^+Y^-$, —$(C_5H_4N)C_2H_5^+Y^-$, —$(C_3H_5N_2)^+Y^-$ (imidizoles), —$(C_7H_7N_2)^+Y^-$ (indizoles), —$C_6H_4COCH_2(NC_5H_5)^+Y^-$, —$(C_5H_4N)CH_3^+Y^-$, and —$C_6H_4CH_2N(CH_3)_3^+Y^-$, wherein $Y^-$ is any halide or an anion such a $NO_3^-$, $OH^-$, $CH_3COO^-$ and the like; or combinations thereof As recognized by those skilled in the art, $Y^-$ may be formed in-situ as part of the manufacturing process or may be associated with the aromatic or alkyl group through a typical salt swap or ion-exchange process.

Further examples of representative organic groups are also described in U.S. Pat. Nos. 5,571,311; 5,630,868; 5,707,432, 5,955,232; 5,922,118; 5,900,029; 5,895,522; 5,885,335; 5,851,280; 5,837,045; 5,713,988; and 5,803,959; PCT Publication No. WO 96/18688; and PCT Publication No. WO 96/18690, all hereby incorporated in their entirety by reference herein.

Further examples of the ionic or ionizable functional groups include amphiphilic counterions which may be cationic or anionic in nature. An amphiphilic counterion is a molecule or compound typically described as have a hydrophilic polar "head" and a hydrophobic "tail." Representative examples of cationic and anionic amphiphilic counterions include those set forth and described in U.S. Pat. No. 5,698,016 to Adams et al., the entire description of which is incorporated herein by reference.

For purposes of further illustrating the present invention, an amphiphilic counterion can be used. The surface-modified colored pigment, as described herein, has a cationic functionality (i.e. positive charge) or anionic functionality (negative charge). The charge preferably is created by the aromatic group or $C_1$–$C_{20}$ alkyl group of the diazotizable group attached to the pigment. If the desired surface-modified colored pigment is anionic in nature, then the amphiphilic counterion will be cationic or positive charging. Similarly, if the surface-modified colored pigment is cationic in nature, then the amphiphilic counterion will be anionic or negative charging.

Examples of cationic amphiphilic counterions include, but are not limited to, those described ammonium ions that may be formed from adding acids to the following: a fatty amine, an ester of an aminoalcohol, an alkylamine, a polymer containing an amine functionality, a polyethoxylated amine, a polypropoxylated amine, a polyethoxylated polypropoxylated amine, an aniline and derivatives thereof, a fatty alcohol ester of amino acid, a polyamine N-alkylated with a dialkyl succinate ester, a heterocyclic amine, a guanidine derived from a fatty amine, a guanidine derived from an alkylamine, a guanidine derived from an arylamine, an amidine derived from a fatty amine, an amidine derived from a fatty acid, an amidine derived from an alkylamine, or an amidine derived from an arylamine. The $pK_a$ of the ammonium ion is preferably greater than the $pK_a$ of the protonated form of the aromatic or alkyl group on the pigment.

Specific examples of cationic amphiphilic ions include dioctylammonium, oleylammonium, stearylammonium, dodecylammonium, dimethyldodecylammonium, stearylguanidinium, oleylguanidinium, soyalkylammonium, cocoalkylammonium, oleylammoniumethoxylate, protonated diethanolaminedimyristate, and N-oleyldimethylammonium. Generally, to form the ammonium ions described above, the various compounds described above such as fatty amines, esters of amino alcohols, etc., are reacted with an acid such as carboxylic acid, a mineral acid, an alkyl sulfonic acid, or an aryl sulfonic acid.

Quaternary ammonium salts can also be used as the sources of the cationic amphiphilic ion. Examples include, but are not limited to, a fatty alkyl trimethyl ammonium, a di(fatty alkyl)dimethylammonium, an alkyl trimethyl ammonium, or 1-alkyl pyridinium salt, where the counterion is a halide, methosulfate, sulfonate, a sulfate or the like. Also, phosphonium salts, such as tetraphenylphosphonium chloride can be used as the sources of the amphiphilic ion.

Cationic amphiphilic ions for use in the present invention include those represented by the formula $R_4N^+$, wherein R is independently hydrogen, $C_1$–$C_{30}$ alkyl, $C_1$—$C_{30}$ alkenyl, $C_7$–$C_{30}$ aralkyl, and $C_7$–$C_{30}$ alkaryl.

Another example of a suitable amphiphilic ion is a polymer containing an ammonium ion derived from an amine containing polymer. The amine containing polymer can be a copolymer of an amine containing monomer, such as dimethylaminoethyl methacrylate or —acrylate, or vinylpyridine or vinylimidazole, and another monomer such as methyl acrylate, methyl methacrylate, butyl acrylate, styrene, and the like. The polymer may also be a ter- or tetra-polymer containing a mixture of an amine containing monomer and two or three other amine containing monomers, respectively. Such a polymer may be prepared by any means, such as radical (emulsion, suspension, or solution) or anionic polymerization.

As stated earlier, the amphiphilic counterion can alternatively be an anionic amphiphilic counterion. Examples of such anionic amphiphilic ions include, but are not limited to, an alkylbenzene sulfonate, an alkyl sulfonate, an alkylsulfate, a sulfosuccinate, a sarcosine, an alcohol ethoxylate sulfate, an alcohol ethoxylate sulfonate, an alkyl phosphate, an alkylethoxylated phosphate, an ethoxylated alkylphenol sulfate, a fatty carboxylate, a taurate, an isethionate, an aliphatic carboxylate, or an ion derived from a polymer containing an acid group. Sources of specific and preferred examples of anionic amphiphilic ions include, but are not limited to, sodium dodecylbenzene sulfonate, a sodium dodecylsulfate, Aerosol OT, an oleic acid salt, a ricinoleic acid salt, a myrisitic acid salt, a caproic acid salt, sodium 2-octyldodecanoate, sodium bis(2-ethylhexyl) sulfosuccinate, a sulfonated polystyrene, or homo- or copolymers of acrylic acid or methacrylic acid or salts thereof.

Generally, the above-identified amphiphilic counterions and related compounds are commercially available in salt form or can be routinely made by one of ordinary skill in the art.

Nonionic groups may include, but are not limited to, hydrophilic groups, hydrophobic groups, alkyl and aryl groups, ethers, polyethers, alkyls, fluorinated alkyls and the like. These amphiphilic type groups can be made and attached onto the colored pigment following the procedures described in U.S. Pat. No. 5,698,016 incorporated in its entirety by reference herein. The colored pigments of the present invention can have steric and amphiphilic groups as well as described in U.S. Provisional Application No. 60/157,284, incorporated in its entirety by reference herein.

Other examples of organic groups that can be attached onto the colored pigment include the following formulas. In each of the following formulas, —X is attached directly to the pigment and —X' can be directly attached to the pigment.

One preferred modified pigment product is a colored pigment having attached at least one group comprising the formula:

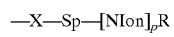

—X—Sp—[NIon]$_p$R wherein X represents an aromatic group or an alkyl group, NIon represents at least one non-ionic group, Sp represents a spacer group, R represents hydrogen, an aromatic group, or an alkyl group, and p is an integer of from 1 to 500.

The aromatic group with respect to the X substituent and/or the R substituent can be substituted or unsubstituted and can be, for instance, an aryl or heteroaryl group. The aromatic group can be substituted with any group, such as one or more alkyl groups or aryl groups. Preferably, the aromatic group is a phenyl, naphthyl, anthracenyl, phenanthrenyl, biphenyl, pyridinyl, benzothiadiazolyl, or benzothiazolyl. Examples of the alkyl group with respect to the X substituent and/or the R substituent include, but are not limited to, substituted or unsubstituted alkyl groups which may be branched or unbranched. The alkyl group can be substituted with one or more groups, such as aromatic groups. Preferred examples of the alkyl group for purposes of the X substituent include, but are not limited to, $C_1$–$C_{12}$, like methyl, ethyl, propyl, butyl, pentyl, or hexyl groups. In other words, X and/or R can represent a branched or unbranched, substituted or unsubstituted, saturated or unsaturated hydrocarbon. Examples of substituted groups include, but are not limited to, an ester group, an amide group, an ether group, a carboxyl group, an aryl group, an alkyl group, and the like.

Sp or the spacer group as used herein is a link between two groups and can be a bond, or a chemical group such as, but not limited to, $CO_2$, $O_2C$, $SO_2$, $CO$, $SO_3$, $OSO_2$, $SO_3NR''$, $R''NSO_2$, $NHCO$, $CONR''$, $NR''CO_2$, $O_2CNR''$, $NR''CONR''$, $O,S$, $NR''$, $SO_2C_2H_4$, arylene, alkylene, $NR''CO$, $NHCO_2$, $O_2CNH$, $NCHONH$, and the like, wherein R'', which can be the same or different, represents an organic group such as a substituted or unsubstituted aryl and/or alkyl group.

Examples of the non-ionic group include, but are not limited to, groups having no apparent ionic charge, such as polymers of ethylene oxide, propylene oxide, other alkylene oxides, carboxylic acid esters, glycols, alcohols, esters, alkanolamine-fatty acid condensates, silicones, isocyanates, alkylpyrrolidenes, and alkylpolyglycosides. In non-aqueous media, the non-ionic group, in addition to the aforementioned groups, may have carboxylates, sulfonates, phosphates, amines, and other groups that typically demonstrate an ionic nature in water. The non-ionic group is preferably a $C_1$–$C_{12}$ alkyl group, or a $C_1$–$C_{12}$ alkylene oxide group p can be 1–25, 26–50, 51–75, 75–100, and/or 101–500, and p preferably is 5 to 50.

The X substituent and/or non-ionic group may be substituted with one or more functional groups. The functional group preferably contains a lypophilic group. Examples of functional groups include, but are not limited to, R', OR', COR', COOR', OCOR', carboxylates, halogens, CN, NR'$_2$, SO$_3$H, sulfonates, —OSO$_3$, NR'(COR'), CONR'$_2$, NO$_2$, PO$_3$H$_2$, phosphonates, phosphates, N=NR', SOR', NSO$_2$R', wherein R' which can be the same or different, is independently hydrogen, branched or unbranched C$_1$–C$_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkylaryl, or substituted or unsubstituted arylalkyl.

Amines also represent examples of functional groups as well as quaternary ammonium groups (—NR$_3^+$) and quaternary phosphonium groups (—PR$_3^+$), as well as quaternary sulfonium groups (—SR$_2^+$).

In an additional embodiment of the present invention, the colored pigment product can be a pigment having attached at least one group comprising the formula:

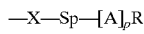

wherein X represents an aromatic group or an alkyl group; Sp represents a spacer group; A represents an alkylene oxide group of from about 1 to about 12 carbons; p represents an integer of from 1 to 500, and R represents hydrogen, a substituted or unsubstituted alkyl group, or a substituted or unsubstituted aromatic group. A can be the same of different when p is greater than 1. X can be substituted or unsubstituted and can include substituted groups such as an ester group, an amide group, an ether group, a carbonyl group, an aryl group, an alkyl group and the like. The substituted groups can be attached or linked to A.

Examples of preferred alkylene groups include, but are not limited to, —CH$_2$—CH$_2$—O—; —CH(CH$_3$)—CH$_2$—O—; —CH$_2$CH$_2$CH$_2$—O—; or combinations thereof.

In another embodiment of the present invention, the colored pigment can be a pigment having attached at least one group comprising the formula:

wherein X is described above, and for instance can represent an aromatic group or an alkyl group as described earlier, m is an integer of from 1 to 12, preferably 2 or 3, p is an integer of from 1 to 500, Sp represents a spacer group, and R is described above, and for instance can be hydrogen, a substituted or unsubstituted alkyl group, or a substituted or unsubstituted aromatic group. Examples of R substituents include, but are not limited to, hydrogen, methyl, ethyl, butyl, or propyl groups. p can be 1–25, 26–50, 51–75, 76–100, and 101–500, and is preferably 5 to 50. Particularly preferred groups of this formula are where X is a benzene group, m is 1 to 5, and more preferably 2 or 3, p is 5 to 50, more preferably 44–45, and R is hydrogen or a methyl group. Another preferred group is where m is 2, p is 7, R is a methyl group, and X is a benzene group.

In yet another embodiment of the present invention, the colored pigment can be a pigment having attached at least one polymeric group, wherein the polymeric group comprises the formula:

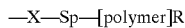

wherein X and Sp are described above, and for instance can represent at least an aromatic group or at least an alkyl group as described earlier, "polymer" comprises repeating monomer groups or multiple monomer groups or both, optionally having at least one —X' group. The 'polymer' can be substituted or unsubstituted with additional groups, and R is described above, and for instance can represent hydrogen, a bond, a substituted or unsubstituted alkyl group, or a substituted or unsubstituted aromatic group. When X represents an alkyl group, the "polymer" preferably has no ionic or ionizable group. X' represents an aromatic group or alkyl group, and each X' and X can be the same or different. The total monomer repeating units that comprise the "polymer" is not greater than about 500 monomer repeating units. X and/or X' can be substituted or unsubstituted and can include substituted groups such as an ester group, an amide group, an ether group, and the like. The substituted groups can be linked to the "polymer." Also, when R represents a bond, the available bond can be attached to the pigment. When X represents an alkyl group in this formula, the polymeric group preferably has no ionic or ionizable group. The polymeric group can be any polymeric group capable of being attached to a pigment.

For purposes of the present invention and this formula immediately above, one or more polymeric groups that comprise the "polymer" can be present. The polymeric group can be a thermoplastic polymeric group or a thermosetting polymeric group. Further, the polymeric group can be a homopolymer, copolymer, terpolymer, and/or a polymer containing any number of different repeating units. Further, the polymeric group present in the present invention can be any type of polymeric group, such as a random polymer, alternating polymer, graft polymer, block polymer, star-like polymer, and/or comb-like polymer. The polymeric group used in the present invention can also be one or more polyblends. The polymeric group can be an interpenetrating polymer network (IPN); simultaneous interpenetrating polymer network (SIN); or interpenetrating elastomeric network (IEN).

Specific examples of polymeric groups include, but are not limited to, linear-high polymers such as polyethylene, poly(vinylchloride), polyisobutylene, polystyrene, polycaprolactam (nylon), polyisoprene, and the like. Other general classes of polymeric groups of the present invention are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, poly(vinyl alcohols), polyurethanes, thermoplastic elastomers, and the like.

Generally, the polymeric groups described in Volume 18 of the Encyclopedia of Chemical Technology, KIRK-OTHMER, (1982), page 328 to page 887, and Modern Plastics Encyclopedia '98, pages B-3 to B-210, and "Polymers: Structure and Properties," by C. A. Daniels, Technomic Publishing Co., Lancaster, Pa. (1989), all incorporated in their entirety herein by reference, can be used as the polymeric groups of the present invention.

The polymeric groups of the present invention can be prepared in a number of ways and such ways are known to those skilled in the art. The above referenced KIRK-OTHMER section, Modern Plastics Encyclopedia, and C. A. Daniels' reference provide methods in which these polymeric groups can be prepared.

The polymeric group is preferably a polyolefin group, a polyurethane group, a polystyrenic group, a polyacrylate group, a polyamide group, a polyester group, or mixtures thereof. Examples of R groups can be the same as previously described above. p can be 1–25, 26–50, 51–75, 76–100, 101–500, and is preferably 1 to 100, and more preferably 5 to 50.

Also, the organic group(s) attached to the colored pigment can be one or more types of dyes, such as, but not limited to, Nile Blue A, Toluidine Blue, Tryan Blue, C.I. Acid Blue 40, C.I. Acid Blue 129, C.I. Acid Blue 9, C.I. Acid Blue 185, C.I. Direct Blue 71, C.I. Direct Blue 199, C.I. Direct Red 9, C.I. Acid Red 18, C.I. Acid Red 27, C.I. Direct Yellow 86, C.I. Direct Yellow 4, C.I. Acid Yellow 23, and C.I. Food Black 2. Besides the organic group comprising the dye, an organic group having an ionic group and a counterionic group can have a dye serving as the counterionic group. Attaching a dye to the colored pigment can provide the advantage of modifying the color properties of pigments. Also, the organic group(s) attached to the colored pigment can be one or more types of light stabilizers, e.g., hindered amine light stabilizer (HALS) or antioxidant.

In addition, the present invention relates to a process for preparing surface-modified colored pigments. The process involves combining at least one treating agent and at least one type of colored pigment(s) in a container (e.g., a jacketed container) to form a mixture and subjecting the mixture to high shearing and introducing at least one diazotizing agent to the mixture for at least a portion of time while the high shearing is taking place, and preferably during the entire time that high shearing is taking place, such that a reaction product is formed and contains surface-modifed colored pigment(s). The treating agent has an organic group which comprises at least one diazotizable group. In a preferred embodiment, the diazotizable group comprises a) at least one aromatic group, at least one $C_1$–$C_{20}$ alkyl group, or mixtures thereof; and b) at least one ionic group, ionizable group, nonionic group, or mixtures thereof. The organic groups mentioned throughout this disclosure can be a part of the treating agent.

The treating agent for use in the process of the present invention comprises an organic group which comprises at least one diazotizable group. For purposes of the present invention, a "diazotizable group" means a nitrogen containing compound which, in the presence of a diazotizing agent, will react to form a diazonium salt. The "diazotizing agent" means any compound which will donate a nitrogen atom during the reaction with the diazotizable group to form the diazonium salt. In a preferred embodiment the diazotizable group comprises a) at least one aromatic group, at least one $C_1$–$C_{20}$ alkyl group, and mixtures thereof, and b) at least one ionic group, ionizable group, nonionic group, and mixtures thereof.

Typically, the diazotizing agent is any metal or organic nitrite including, for example, ammonium nitrite, butyl nitrite, dicyclohexylammonium nitrite, ethylnitrite, isoamylnitrite, lithium nitrite, sodium nitrite, potassium nitrite, or zinc nitrite, and may also include nitrous acid, nitrogen oxide, nitrogen dioxide, and mixtures thereof.

In more detail, the combining of at least one treating agent and at least one type of colored pigment(s) in a container to form a mixture can be accomplished in any fashion, including, but not limited to, pouring each component into a vessel or other container at the weight ratio of the treating agent to the colored pigment as determined by the desired treatment level, reaction efficiency, and pigment surface area. For example, from about 10% to 50% by weight of treating agent can be used.

Typically, a solution is prepared by mixing the desired treating agent in a liquid reaction medium. Preferably, the mixing occurs for a sufficient amount of time to substantially dissolve or distribute the treating agent. A preferred liquid reaction medium includes water, any medium containing water, any medium containing alcohols, and mixtures thereof. A water based reaction medium is most preferred.

The treating agent, alone or dissolved or distributed in a liquid reaction medium, and the colored pigment can be added separately, and the high shearing, which is part of the process, can mix the two components together to form a mixture. As part of the process, the mixture is subjected to high shearing. In a preferred embodiment, the mixing takes place in a suitable vessel under high shear conditions and utilizes equipment capable of providing a grinding or impact action, liquid shear cavitation or other means of particle size reduction. Different shearing devices can be used in combination or in series such as horizontal media mills, vertical media mills such as attritors, ball mill, hammer mills, pin disk mills, fluid energy mills, jet mills, sonicators, and the like. Preferably, the high shearing occurs in high pressure fluid impingement reactors. Other examples include, but are not limited to, high pressure homogenizers, rotor stators, distributive devices, impact dispersers (media/ball), and the like. For purposes of this invention, "high shear" means an energy sufficient to reduce the particle size distribution of the colored pigment to a desired size and continually expose new surfaces of the colored pigment to the reaction solution, thereby improving the distribution and level of the treating agent being attached to the surface of the colored pigment and the overall product yield. Preferably, the same vessel is used in the high shear mixing step as that used to prepare the reaction solution of treating agent and diazotizing agent. In addition, the vessel may be preferably equipped with suitable means for adding heat or removing heat, such as a heating mantle, thermocouple and the like.

The operating temperature and pressure of the process can be any temperature or pressure as long as the liquids being processed remain a liquid during the process. For instance, the temperature can be from about 0 to about 90 degrees C. when in an aqueous environment.

The reaction time depends on the treating agent(s) used, but typically can be from about 30 minutes or less to about 5 hours or more. The residence time of the reactants in the process can be any time and is typically dependent on the desired particle size and/or the reaction rate. Typically, the residence time is from about 30 minutes to about 7 days or more, and preferably is from about 30 minutes to about 24 hours, and most preferably is from about minutes to about 5 hours. Typically, the high shear mixing will occur at a temperature ranging from about 0° C. and 90° C. for a time period between 30 minutes and 48 hours.

Preferably, the high shear mixing takes place at a temperature ranging from about 50° C. and 75° C. for a time period between 1 hour and 24 hours because such a range has been found to produce a surface-modified colored pigment with improved dispersibility, stability and color intensity.

In the present process, at least one diazotizing agent is introduced to the mixture for at least a portion of time while the high shearing is taking place, and preferably while the entire high shearing is taking place, such that a reaction product is formed and contains surface-modifed colored pigment(s). Adding the diazotizing agent in this manner permits the formation of the diazonium salt in a continuous fashion which permits the attachment of organic groups on the new surfaces of the colored pigment being created as the colored pigment is being reduced in particle size (i.e., as the surface area of the colored pigments is being increased during shearing operations). The diazotizing agent can be introduced in any manner, such as pumping, nozzles, or by in-line static mixing.

In the present process, the shearing of the colored pigments can begin before, during, and/or after the introduction of the diazotizing agent. By shearing the colored pigments beforehand, the colored pigments can begin to be broken up before attachment of organic groups begins by the addition of the diazotizing agent. Further, with the present process, any combination of steps can be preformed, such as adding the diazotizing agent and then shearing and then adding more diazotizing agent which can be the same or different from the first diazotizing agent added. Thus, it is within the bounds of the present invention to have any combination and/or sequence of steps with respect to shearing and the addition of the diazotizing agent and the treating agent. Further, a combination of different diazonium salts can be formed to attach more than one type of organic group on the surface of the colored pigment(s).

Depending on the shearing device, the amount of solids during processing can vary and various amounts are preferred. For instance, when a high pressure homogenizer is used, less than 30% solids is preferred, and less than 20% solids is more preferred, and less than about 10% solids is most preferred, wherein the % is based on by weight of the entire material being processed. With respect to a rotor stator, less than 30% solids is preferred, and less than 20% solids is more preferred, and from about 5% to about 15% solids is most preferred. With respect to a distributive device, less than 50% solids is preferred, from about 5 to about 50% is more preferred, and from about 20% to about 40% solids is most preferred. With respect to an impact disperser, less than 50% solids is preferred, from about 5% to about 50% solids is more preferred, and from about 10% to about 20% solids is most preferred.

To prepare the above modified pigment products, the diazonium salt need only be sufficiently stable to allow reaction with the pigment. Thus, that reaction can be carried out with some diazonium salts otherwise considered to be unstable and subject to decomposition. Some decomposition processes may compete with the reaction between the pigment and the diazonium salt and may reduce the total number of groups attached to the pigment. Further, the reaction may be carried out at elevated temperatures where many diazonium salts may be susceptible to decomposition. Elevated temperatures may also advantageously increase the solubility of the diazonium salt in the reaction medium and improve its handling during the process. The pigment can be reacted with a diazonium salt when present as a dilute, easily stirred, aqueous slurry, or as a more concentrated highly mixed slurry in water or thick paste.

A preferred method of preparing the modified pigment products involves reducing the pigments to be modified to a size desirable for the particular end use application. If, of course, the pigment is already of an appropriate size, then no reduction in size is necessary. Generally, the size of the pigment can be the same size as the pigment sizes used conventionally for the particular end use applications. For instance, the average particle size of the pigment can be about 10 microns or less, and preferably about 5 microns or less. Preferably, for instance, in inkjet ink applications, the average pigment particle size is preferably less than about 1 micron and more preferably less than about 0.5 micron (e.g., a preferred range is about 0.01 micron to less than about 1 micron), and is preferably less than about 10 microns for coatings, toner, polymer, and rubber applications. If size reduction of the pigment to be modified is preferred, any method of reducing size can be used such as those described in T. C. Patton, "Paint Flow and Pigment Dispersion," 2nd ed., Wiley, N.Y. (1979), incorporated herein by reference.

The level of treatment of the various groups attached on the pigment can be any amount and preferably is from about 0.10 to about 50 micromoles/m$^2$, and more preferably is from about 0.30 to about 10 micromoles/m$^2$. When low levels of treating agent are desired, it has been found that the diazotizable/organic group is typically introduced (i.e. present in the reaction solution) at a level from about 0.01 to 5.0 micromoles/m$^2$ of the colored pigment used, based upon the nitrogen surface area of the colored pigment. When traditional levels of treating agent are desired, it has been found that the diazotizable/organic group is typically introduced (i.e. present in the reaction solution) at a level from about 5.0 to 50.0 micromoles/m$^2$ of the colored pigment used, based upon the nitrogen surface area of the colored pigment. Lastly, it will be appreciated by those skilled in the art that the pH of the reaction mixture may be varied depending on the particular treating agent and the most efficient reaction conditions and may, for example, be at a pH around neutral if appropriate.

An advantage of the present invention is that the colored pigments having at least one organic group attached preferably have substantially, if not the same, color of the starting colored pigment prior to being modified.

The pigment products may be purified by washing, such as by filtration, centrifugation, or a combination of the two methods, to remove unreacted raw materials, byproduct salts, and other reaction impurities. The products may also be isolated, for example, by evaporation or it may be recovered by filtration and drying using known techniques to those skilled in the art. Dispersions of the pigments of the present invention may be further purified or classified to remove impurities and other undesirable free species which can co-exist in the dispersion as a result of the manufacturing process. In a preferred embodiment, the pigment dispersions are subject to a classification step, such as centrifugation, to substantially remove particles having a size above about 1.0 micron, preferably above about 0.5 micron. In addition, the dispersion is preferably purified to remove any undesired free species, such as unreacted treating agent. Known techniques of ultrafiltration/diafiltration using a membrane or ion exchange may be used to purify the dispersion and remove a substantial amount of free ionic and unwanted species. Also preferred is an optional exchange of counterions whereby the counterions that form a part of the surface-modified pigment are exchanged or substituted with alternative counterions utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, carboxylate, and $Br^-$. Such additional classification and purification methods are more fully described in U.S. patent application Ser. No. 09/240,291, filed Jan. 29, 1999, the disclosure of which is fully incorporated herein by reference.

Uses of the Colored Pigments

The colored pigments of this invention may be used in the same applications as conventional pigments. The groups preferably attached to the pigment, however, can be used to modify and improve the properties of a given pigment for a particular use.

The colored pigments according to the present invention can be used in a number of end use applications. These uses include, for example, plastic compositions, aqueous and non-aqueous inks, aqueous and non-aqueous coatings, rubber compositions, toner compositions, paper products, and textile and fiber compositions. The following paragraphs describe these uses generally and examples of each are shown below.

The colored pigments of the present invention may be used in aqueous or solvent based compositions containing conventional pigments. The following discussion relating to ink compositions is similarly applicable to other liquid systems including, for example, coatings, papers, inks, toners, adhesives, latexes, textiles and fibers.

The present invention relates to an inkjet ink composition comprising an aqueous or non-aqueous vehicle and a colored pigment of the present invention. In contrast to conventional pigments, the colored pigments for use in the inkjet ink of the present invention are not difficult to disperse in an aqueous or non-aqueous vehicle. The colored pigments do not necessarily require a conventional milling process, nor are additional dispersants necessarily needed to attain a usable ink. Preferably, the modified pigment products only require low shear stirring or mixing to readily disperse the pigment in water or other solvent.

Formation of an inkjet ink containing a vehicle and stably dispersed colored pigment can be preformed with a minimum of components and processing steps when the above modified pigment products are utilized. Such an ink may be used in any inkjet printer known in the art. Preferably, in inkjet inks of the present invention, the colored pigments are present in an amount of less than or equal to 20%–25% by weight of the inkjet ink. It is also within the bounds of the present invention to use an inkjet ink formulation containing a mixture of unmodified pigment with the colored pigments of the present invention. Common additives such as those discussed below may be added to the dispersion to further improve the properties of the inkjet ink.

Suitable additives are also generally incorporated into the ink or ink jet composition to impart a number of desired properties while maintaining the stability of the compositions. For example, a surfactant or suitable polymer may be used to further enhance the colloidal stability of the colored pigment in the ink composition. Other additives are well known in the art and include humectants, biocides, binders, drying accelerators, penetrants and the like. Examples of humectants include ethylene glycol, propylene glycol, diethylene glycol, glycerine, dipropylene glycol, polyethylene glycol, polypropylene glycol, alkane diols, amides, ethers, carboxylic acids, esters, alcohols, organosulfides, organosulfoxides, sulfones, alcohol derivatives, 2-pyrrolidone, ether derivatives, amino alcohols, and ketones. The amount of a particular additive will vary depending on a variety of factors but are generally present in an amount ranging between 0% and 40%, preferably between 0.1% and 10%, although the amount may be outside this range.

In particular, a humectant may be added to reduce the rate of evaporation of water in the ink to minimize clogging. If the ink begins to dry out, the humectant concentration increases and evaporation decreases further. Humectants may also affect other properties of the ink and prints made therefrom, such as viscosity, pH, surface tension, optical density, and print quality. Preferred humectants include ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones.

Biocides such as benzoate or sorbate salts are important in preventing bacterial growth. Bacteria are often larger than ink nozzles and can cause clogging and other problems. Binders attach to the substrate to hold the colorant on the paper. Examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. Drying accelerating agents promote evaporation of the ink once the ink is placed in the paper. These include sodium lauryl sulfate, N,N-diethyl-m-toluamide, cyclohexylpyrrolidinone, and butyl carbitol. Penetrants such as alcohols, sodium lauryl sulfate, esters, and ketones allow the ink to penetrate the surface of the paper. Alcohols may also be used to increase the rate of drying of the liquid ink, and surfactants like detergents and soap reduce the surface tension to allow the ink to spread on the substrate.

Additionally, the modified pigment products-based inkjet inks may incorporate some dye to modify color balance and adjust optical density. Such dyes include food dyes, FD & C dyes, derivatives of phathalocyanine tetrasulfonic acids, including copper phthalocyanine derivates, tetra sodium salts, tetra ammonium salts, tetra potassium salts, tetra lithium salts, and the like.

Polymers or oligomers may be added to inkjet inks based on the modified pigment products. The images created from such an ink may be water-insoluble upon polymerization or cross-linking of the added polymers or oligomers.

Additionally, in preparing inkjet inks utilizing the modified pigment products of the present invention, sequential filtration of the inks through filters of descending size or centrifugation or both may be used to obtain a more desirable final product. For instance, filtering first with a 3.0 micron filter and then filtering with a 1.0 micron filter, and so on, as desired. In addition, the size of the modified pigment products in the inkjet inks is preferably no larger than about 2 microns. More preferably, the size of the modified pigment product is one micron or less.

Advantageously, the inkjet inks of the invention have excellent stability over time and a wide range of temperatures, have desirable viscosities and surface tensions, and when printed, have good optical density, print clarity, rub resistance, and waterfastness.

Ink compositions containing the colored pigments of the present invention have been found suitable for use in imaging applications, particularly for use in ink jet inks. Such ink and ink jet compositions exhibit improved formulation properties and storage stability. In addition, images generated from such ink and ink jet compositions exhibit good waterfastness and color intensity.

The colored pigments of the present invention are present in the aqueous or solvent based ink or ink jet composition in an amount effective to provide the desired image quality, e.g., optical density, without detrimentally affecting the performance of the ink. Typically, the colored pigments will be present in an amount ranging from about 1% to about 20%, preferably from about 2% to about 10%, based on the weight of the ink composition. In addition, the colored pigment is typically as small as possible to enable a stable colloidal suspension of the pigment in the liquid vehicle and to prevent clogging of the ink channels and nozzles when used in the desired printing application. For example, a preferred average particle size of the surface-modified colored pigment for use in a thermal ink jet printer are generally below 1.0 micron, preferably in a range from about 0.005 micron to about 0.3 micron.

The ink compositions of the present invention may be prepared utilizing conventional techniques known to those skilled in the art, such as combining or mixing the desired component in a suitable aqueous or solvent based medium. When the ink and ink jet compositions are aqueous based systems, a significant amount of water, preferably deionized or distilled water, is typically used. For example, the amount of water or similar medium is generally present in an amount ranging from about 50% to about 95%, preferably from about 60% to 80%, based on the weight of the ink or ink jet composition.

The ink and ink jet compositions of the present invention may be buffered to the desired pH by the addition of a suitable base, such as sodium hydroxide, ammonium hydroxide, triethylamine, dimethylethanolamine and the like, or a suitable acid, such as mineral acids, hydrochloric acid, sulfuric acid and the like. In addition, a polymer which is soluble in the ink composition may be added to improve the waterfastness of the images generated from the ink compositions. By "soluble" is meant that the polymer will dissolve in the ink vehicle to form a one phase system. These polymers include, for example, polyvinyl alcohol, polyester, polyestermelamine, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl napthalene-acrylic acid copolymers, vinyl napthalene-maleic acid copolymers and salts thereof Additional polymers include polyvinylimidazole, derivatives of polyvinylimidazole, polyvinylpyrolidone and copolymers thereof, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, derivatives of polyethyleneimine, and mixtures thereof, as described in PCT Publication No. WO 96/18688, the disclosure of which is fully incorporated herein by reference.

Printed images may be generated from the ink or ink jet compositions of the present invention by incorporating such compositions into a suitable printing apparatus, and generating an image onto a substrate. Suitable ink jet printers include, for example, thermal printers, piezoelectric printers, continuous printers, valve printers and the like. Similarly, any suitable substrate can be employed including plain papers, bonded papers, coated papers, transparency materials, textile materials, plastics, polymeric films, inorganic substrates and the like.

As noted above, the colored pigments of the present invention may be useful in a wide variety of aqueous or solvent based applications and, in particular, ink compositions to provide the desired color and intensity. Unlike conventional pigments, the colored pigments of the present invention are readily dispersed in the desired liquid vehicle. In addition, the colored pigment are colloidally stable in the liquid vehicle and does not require conventional milling, nor the aid of a dispersant. The colored pigments preferably require only low shear mixing or stirring into the liquid vehicle.

The colored pigments of the present invention can be used as colorants in a plastic material. The colored pigments of the present invention can also be used to impart conductivity to a plastic material. The colored pigments of the present invention may give an increased rate of dispersion or improved quality of dispersion over the corresponding untreated or conventional pigment. These improvements offer an economic advantage in plastic manufacture and in value of the finished product, respectively. Using the colored pigment of the present invention may improve impact strength of the plastic. Thus, the invention relates to an improved plastic composition comprising a plastic and the colored pigments of the present invention.

As with conventional pigments, the colored pigments of the present invention can be used with a variety of plastics, including but not limited to plastics made from thermoplastic resins, thermosetting resins, or engineered materials, for example, composites. Typical kinds of thermoplastic resins include: (1) acrylonitrile-butadiene-styrene (ABS) resins; (2) acetals; (3) acrylics; (4) cellulosics; (5) chlorinated polyethers; (6) fluorocarbons, such as polytetrafluoroethylene (TFE), polychlorotrifluoroethylene (CTFE), and fluorinated ethylene propylene (FEP); (7) nylons (polyamides); (8) polycarbonates; (9) polyethylenes (including copolymers); (10) polypropylenes (including copolymers); (11) polystyrenes; (12) vinyls (polyvinyl chloride); (13) thermoplastic polyesters, such as polyethylene terephthalate or polybutylene terephthalate; (14) polyphenylene ether alloys; and blends and alloys of the above with rubber modifiers. Typical thermosetting resins include: (1) alkyds; (2) allylics; (3) the aminos (melamine and urea); (4) epoxies; (5) phenolics; (6) polyesters; (7) silicones; and (8) urethanes.

Generally, the colored pigment is added like any other pigment to the plastic used to form a plastic premix. This can be done, for example, in a dry mix or a melt stage. The modified pigment product may also be incorporated on or in a plastic by adding it to a solvent, where the plastic is soluble or partially-soluble, followed by removal of the solvent (e.g., by evaporation). The colored pigments of the present invention may be used in combination with other conventional additives in plastic compositions. According to the invention, the term plastic composition includes, but is not limited to, any plastic material, article, goods, surface, fabric, sheet, film, and the like. For example, plastic materials include automotive parts, siding for homes, liners for swimming pools, roofing materials, packaging materials, synthetic fibers, food, and storage containers, light absorbing applications (e.g., bar codes), and any variety of other household or industrial items.

The colored pigments of the present invention are also useful in aqueous and non-aqueous ink formulations. Thus, the invention provides an ink composition comprising an ink vehicle and a modified pigment product. Other known ink additives may be incorporated into the ink formulation. Typical inks include, but are not limited to: lithographic, letterpress, flexographic, gravure, screening, phase change ink jet inks, and ink jet applications.

In general, an ink consists of four basic components: (1) a colorant, (2) a vehicle or varnish which functions as a carrier during printing, (3) additives to improve printability, drying, and the like, and (4) solvents to adjust viscosity, drying and the compatibility of the other ink components. For a general discussion of the properties, preparation and uses of inks, see The Printing Manual, 5th Ed., Leach et al, Eds. (Chapman and Hall, 1993) incorporated herein by reference. Various ink compositions are also disclosed, for example, in U.S. Pat. Nos. 2,833,736; 3,607,813; 4,104,833; 4,770,706; and 5,026,755, incorporated in their entirety herein by reference.

The colored pigments of the present invention, either as predispersion or as a solid, can be incorporated into an ink formulation using standard techniques. Use of a water dispersible or solvent-dispersible modified pigment product of the present invention can provide a significant advantage and cost savings by reducing or eliminating the milling steps generally used with other conventional pigments.

Flexographic inks represent a group of ink compositions. Flexographic inks generally include a colorant, a binder, and a solvent. The modified pigment products of the invention are useful as flexographic ink colorants.

The colored pigments of the present invention can be used in news inks. For example, a news ink composition may comprise an ink vehicle (e.g., water), the colored pigments of the present invention, a resin, and optional conventional additives such as antifoam additives or a surfactant.

The colored pigments of the present invention may also be used in phase change (hot melt) inks. Phase change inks generally include at least one colorant and at least one phase change or wax carrier (e.g., a fatty amide-containing material like a mixture of a tetra amide compound and a mono-amide compound, or an alkanolamides and polyethylene glycol mixture). The phase change ink is in a solid phase at ambient temperature and in a liquid phase at an elevated operating temperature of the printer. When the ink is heated it melts to form a low viscosity fluid that can be ejected as droplets. Upon jetting, heated droplets impact on a substrate, and cool to ambient temperature forming films of uniform thickness. Subsequent impaction of the droplets on the substrate may also occur, depending upon the type of printer used. Use of the colored pigments of the present invention can provide a significant advantage in dispersion stability and carrier compatibility over conventional pigments and in light-fastness over dyes.

The colored pigments of the present invention can also be used in lithographic or flexographic printing. For example, the ink or fountain solution used in the printing process can contain the colored pigments of the present invention.

The colored pigments of the present invention can also be used in the manufacture of lithographic printing plates, such as infrared or near-infrared laser-imageable printing plates. Typically, imaging occurs when the plate is exposed to radiation having wavelengths of between 800 and 1100 nm. Generally, an infrared or near-infrared laser-imageable lithographic printing plate includes at least the following layers: a grained-metal or polyester plate or sheet-like substrate and a radiation-absorptive layer coated thereon. Protective layers for the substrate or the surface of the coated plate may also be used in the present invention. When coated onto the substrate, the protective layer can also serve as an adhesion-promoting primer. Other layers may be used, for example, to improve adhesion between layers and durability of the printing plate. The radiation-absorptive layer contains the colored pigment of the present invention along with other conventional ingredients, such as resins and binders. In the imaging process, a lithographic printing plate is selectively exposed to a laser output or other source capable of removing or chemically modifying the radiation-absorbent layer or layers adjacent thereto. The laser output will define a pattern on the printing plate and remove or modify only those portions of the radiation-absorptive layer which define the pattern. Afterwards, the printing plate can be further developed by subjecting it to a solvent capable of removing the imaged layer(s), if any remains, which defines the same pattern. The details of the various conventional components and techniques for such printing plates are described in U.S. Pat. No. 5,493,971; EP 0 803 771 A1; EP 0 770 494 A2; EP 0 770495 A1; as well as PCT Publication WO-98/31550 and the patents and publications referenced therein, all of which are incorporated in their entirety by reference herein.

The colored pigments of the invention may also be used in coating compositions such as paints or finishes, or the like. Thus, an embodiment of the invention is a coating composition comprising an aqueous or non-aqueous vehicle, resin or binder, and a modified pigment product. Other known coating additives may be incorporated in the coating compositions. See, for examples, McGraw-Hill Encyclopedia of Science & Technology, 5th Ed. (McGraw-Hill, 1982), incorporated herein by reference. See also U.S. Pat. Nos. 5,051,464; 5,319,044; 5,204,404; 5,051,464; 4,692,481; 5,356,973; 5,314,945; 5,266,406; and 5,266,361, incorporated in their entirety by reference herein.

The colored pigments of the present invention, either as a predispersion or as a solid, can be incorporated into a coating composition using standard techniques. Use of a water or solvent dispersible modified pigment product provides a significant advantage and cost savings by reducing or eliminating the milling steps generally used with other conventional pigments.

The colored pigments of the present invention may also be used in paper compositions. Accordingly, the present invention relates to a paper product comprising paper pulp and at least one modified pigment product.

The colored pigments of the present invention, either as a solid or a predispersion, can be incorporated into paper pulp using standard papermaking techniques as with conventional pigments. Use of a water or solvent dispersible modified pigment product discussed above may provide a significant advantage and cost savings by reducing or eliminating the steps generally used to disperse other conventional pigments.

The paper products of the invention may incorporate other known paper additives such as sizing agents, retention aids, fixatives, fillers, defoamers, deflocculating agents, and the like. Advantageously, the water or solvent dispersible colored pigments discussed above are retained more efficiently at low loading levels when compared to the untreated pigments when retention aids and acidic or alkaline sizing agents are used.

The colored pigments of the present invention may also be used, as with conventional pigments, as pigments, fillers, and reinforcing agents in the compounding and preparation of rubber compositions. Accordingly, the invention relates to a rubber or elastomeric composition containing at least one rubber or elastomer and at least one colored pigment of the present invention.

The colored pigments of the present invention, can be useful in both natural and synthetic rubber compositions or mixtures of natural and synthetic rubbers.

The colored pigments may be mixed with natural or synthetic rubbers by normal means, for examples by milling. Generally, amounts of the modified pigment product ranging from about 10 to about 250 parts by weight can be used for each 100 parts by weight of rubber in order to impart a significant degree of reinforcement.

Rubbers suitable for use with the present invention are natural rubber and its derivatives such as chlorinated rubber. The modified pigment products of the invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1, and pentene-1.

The rubber composition of the present invention can therefore contain at least one elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between −120° C. and 0° C. Examples of such elastomers include poly(butadiene), poly(styrene-co-butadiene), and poly(isoprene).

The modified pigment products of this invention may also be used to color fibers or textiles. Preferred colored pigments for this use are the dispersible colored pigments. Accordingly, the invention relates to fiber and textile compositions comprising a fiber or textile and a modified pigment product. Fibers suitable for use comprise natural and synthetic fibers such as cotton, wool, silk, linen, polyester and nylon. Textiles suitable for use comprise natural and synthetic fibers such as cotton, wool, silk, linen, polyester and nylon. Preferably natural fibers and textiles comprising cotton, wool, silk, and linen are used.

The colored pigments of the present invention may be colored by means known in the art to color fibers and textiles with, for example, direct and acid dyes. Also, the modified pigments can be incorporated into fibers by spinning techniques, such as wet spinning, dry spinning, and melt spun techniques. For a general discussion of coloring with dyes, see Kirk-Othmer Encyclopedia of Chemical Technology, Vol 8 pp 280–350 "Dyes, Application and Evaluation" (John Wiles and Sons, 1979), incorporated herein by reference. Use of a water or solvent dispersible modified pigment product discussed above provides a method for coloring these materials with a lightfast colorant.

The present invention also relates to toner compositions comprising toner resin particles and the modified pigment particles of the present invention. Conventional additives as described in U.S. Pat. Nos. 5,278,018; 5,510,221; 5,275,900; 5,571,654; and 5,484,575; and EP 0 270-066A1 can be used and these patents are incorporated herein by reference.

The present invention will be further clarified by the following examples, which are intended to be purely exemplary of the present invention.

EXAMPLES

Ink-Jet ink formulation: Colored pigments in the examples below were formulated into ink-jet printer inks with the following ingredients and percentage amount by weight: organic color pigment 3%, ethylene glycol 7.5%, glycerol 7.5%, iso-propanol 4%, and balanced amount of deionized-water. The resulted inks were well mixed to ensure uniformity.

Printing Test: Test prints were printed out on 6 different types of commercially available papers from the above ink jet inks with a Canon BJC 4400 printer and BCI-21 cartridge.

Some or all of the following properties were determined and expressed as an average on the six types of papers from the test prints: CIELab color space, optical density (OD), light fastness (LF), waterfastness (WF), and particle size distributions. Tristimulus color values, L*, a*, and b*, were determined using a Hunter Lab Scan II instrument (available from Hunter Associates Laboratory, Inc. Reston, Va.). OD was determined by Macbeth Densitometer RD 915S (available from GretagMacbeth LLC, New Windsor, N.Y.). LF was determined by changes of trisimulus color and OD after exposing prints in a Q-UV weather-o-meter (available from Q-Panel, Cleveland, Ohio) for 3 weeks. The color difference $\Delta^*ab$ between the initial color of the prints and the color of the prints after the exposing were determined from $L^*a^*b^*$ values by the following equation.

$$\Delta^*ab=[(\Delta L^*)^2+(\Delta a^*)^2+(\Delta b^*)^2]^{1/2}$$

Waterfastness (WF) test was done by printing a series of 0.32 cm solid bars with 0.96 cm spacing on six type of papers. The print samples were held at an approximately 45 deg angle, then squirting 0.25 mL of water at the appropriate time point (1 minute after printing, 5 minutes after printing, etc.). If the runoff of the water squirt was clear, then the print was considered to be waterfast at that time point.

Mean volume particle size distribution of ink jet inks or pigment dispersions was determined by dynamic light scattering method using MICROTRAC Ultrafine Particle Analyzer (available from Honeywell, Minneapolis, Minn.).

Two colloidal stability tests were described below to represent the types of test performed to evaluate the stability (changing of particle size distribution) of pigment dispersions, or pigment dispersions with organic solvent.

Accelerating aging test: In this test 10% pigment dispersions or 5% pigment dispersion with 10% 2-pyrrolidone were placed into an oven at 70° C. for 3 weeks. The change of mean particle size was used as criteria to judge the stability.

Freeze and thaw test: In this test 10% pigment dispersions or 5% pigment dispersion with 10% 2-pyrrolidone were first frozen at −20° C. for one day and then thawed at 70° C. for another day. This was defined as one cycle. After each cycle the change of mean particle size was used as criteria to judge their stability. If after three cycles the mean particle size did not change significantly, those dispersions were considered stable.

Their good filterability and low accusizer number also characterized the qualities of surface modified organic pigment dispersions in this invention.

Filterability Test: Take 100 ml pigment dispersion at 5% pigment loading and pass through a 3 micron nylon absolute filter (available from Pall Filtron, Northborough, Mass.) under 300 mmHg vacuum. The time for this material to pass through the filter was measured.

Accusizer Test: AccuSizer Model 780 (available from PSS NICOMP, Santa Barbara, Calif.). Settings

| | |
|---|---|
| Collection Time | 60 sec |
| Number Channels | 128 |
| Vessel Fluid Volume | 60 ml |
| Flow Rate | 60 ml/min |
| Max Coincidence | 9000 |
| Number Cycles | 1 |

Sample preparation: 0.3 ml of pigment dispersion was diluted in 100 ml DI water. Then 0.2 ml of the diluted sample was injected into accusizer vessel. The total number of particles per mL greater than 0.5 micron and 1 microns were recorded and adjusted to reflect the concentration of particles per ml of the initial dispersion corrected to the appropriate solid level.

Elemental Analysis: Elemental analysis of sulfur, sodium, potassium, calcium, and magnesium in the surface modified organic pigments were obtained from a commercial analytical laboratory (Schwarzkopf Micro-analytical Lab, Woodside, N.Y.) using well known methods.

Example 1

Preparation of a Surface Modified Organic Pigment Product in a High-pressure Fluid Impingement Reactor Sulfanilic acid (102 g, available from Aldrich Chemical, Milwaukee, Wis.) and $PR_{122}$ (500 g, pigment red 122, available from Sun Chemical, Cincinnati, Ohio) were added to 9100 g of DI water and mixed in a jacketed tank equipped with an overhead stirrer until the material was wetted. The amount of sulfanilic acid added corresponds to a treatment level of 1.2 mol of sulfanilic acid per kg of pigment. The material was then pumped via a diaphragm pump into a high pressure reactor (Microfluidizer Model 210 B, Microfluidics International Corporation, Newton Mass.) equipped with an interaction chamber, type L30Z, at a pressure of 15 000 psi. The material exiting the reactor was recirculated to the feed tank. The temperature of the material in the feed tank was maintained in the 55–75° C. by controlling the jacket temperature. As soon as the material was at 60° C., a 20% sodium nitrite solution (204 g, available from Aldrich Chemical, Milwaukee, Wis.) was added uniformly over a 1 hr period, initiating the surface modification reaction. After all the sodium nitrite solution had been added, the reaction continued for another hr, while maintaining the temperature in the desired range. After completion, the reaction mixture was allowed to cool, the pH was adjusted to 7 using sodium hydroxide and the material was concentrated to 10% and purified using ultrafiltration (Microza Hollow Fiber Membranes SLP1053, Pall Filtron, Northborough, Mass.). Further processing may include centrifugation or filtration for the removal of large particles and ion exchange to replace the counter-ion of the attached surface functionality.

Example 2

Preparation of a Surface Modified Organic Pigment in a High Shear Rotor Stator Mixer To a rotor stator (Silverson Model L4RT-A, Silverson, East Longmeadow, Mass.) equipped with a jacketed 4 liter stainless steel vessel 1500 grams DI-water, which had been pre-heated to 60° C., were added. Then 44.98 grams of sulfanilic acid were added to the vessel and the mixture was allowed to mix at 8000 rpm for 10 minutes. Then, 17.94 grams of sodium nitrite dissolved in 150 grams of DI-water was added to the reaction mixture to pre-form the reactive species. Immediately after all the sodium nitrite had been added, 200 g of copper phthalocyanine blue (pigment blue, Sunfast 15:4, available from Sun Chemical, Cincinnati, Ohio) was added to the rotor stator. The reaction mixture was allowed to mix at 8500 rpm for 1 hr, before 44.98 grams of additional sulfanilic acid was added and followed by 17.94 grams of sodium nitrite (which were dissolved in 150 grams of DI-water). The resulting mixture was allowed to react at 8500 rpm for additional 3 hrs at 65° C. The treatment level was equivalent to 2.6 mol of sulfanilic acid per kg of blue pigment. Reaction mixture was then filtered through a 20 mm screen and purified using ultrafiltration until the permeate was colorless. The resulting water dispersible blue pigment was then centrifuged at 10,000 rpm for 30 minutes using a type-19 rotor (L-80 Ultracentrifuge made by Beckman) to remove any unwanted large particles to give a stable aqueous dispersion of surface modified phthalocyanine blue pigment for further analysis and treatment.

Example 3

Surface Modified Organic Pigments and Ink-jet Inks with Different Particle Size Distribution Pigment 3.1 and Pigment 3.2 were prepared in an analogous way as in Example 2, with the exception that the pigment type used was PR122 and the treatment level was 1.2 mol/kg. In addition, pigment 3.2 was centrifuged for an additional 1.5 hrs to reduce the particle size. Pigment 3.3 was produced as described in example 1. These pigments were formulated into a ink-jet ink as previously described and the following test data were obtained. As can be seen, the present invention can be used to obtain pigments with desired particle size. The highest overall yield was achieved when utilizing the high-pressure fluid impingement reactor.

TABLE 1

| Properties | Pigment 3.1 | Pigment 3.2 | Pigment 3.3 |
| --- | --- | --- | --- |
| Pigment Type | PR 122 | PR 122 | PR 122 |
| Treatment Agent | Sulfanilic acid | Sulfanilic acid | Sulfanilic acid |
| Mean volume particle diameter (microns) | 0.158 | 0.123 | 0.099 |
| Yield (%) | 45 | 10 | 80 |
| Properties of Inks | | | |
| OD | 1.00 | 0.96 | 1.00 |
| WF | 1 min | 4 min | 2 min |
| L* | 56.2 | 54.2 | 54.3 |
| a* | 47.1 | 44.0 | 45.7 |
| b* | −9.1 | −11.6 | −12.3 |

Example 4

Surface Modified Organic Pigments and Ink-jet Inks with Different Treating Agents In this example all three pigments were prepared according to the procedures described in Example 2, with the exceptions that the treatment level was at 1.2 mol/kg and three different treating agents were used. All three dispersions showed good stability over the accelerating aging test. From Table 2 the present invention was able to modify pigment surfaces with a variety of functional groups to achieve different surface properties.

TABLE 2

| Properties | Pigment 4.1 | Pigment 4.2 | Pigment 4.3 |
| --- | --- | --- | --- |
| Starting Pigment | PR 122 | PR 122 | PR 122 |
| Treating Agent | Sulfanilic Acid | p-Amino-benzoic acid | N-p-amino-phenyl pyridinium chloride |
| Mean volume particle diameter (nm) | 158 | 132 | 153 |
| Yield | 45% | 65% | 35% |
| Zeta Potential* | −20 mv | −37 mv | +9 mv |
| Properties of Ink | | | |
| OD | 1.00 | 1.09 | 1.12 |
| WF | 1 minute | 1 minute | 1 minute |

TABLE 2-continued

| Properties | Pigment 4.1 | Pigment 4.2 | Pigment 4.3 |
|---|---|---|---|
| L* | 56.2 | 53.4 | 53.7 |
| a* | 47.1 | 48.4 | 49.3 |
| b* | −9.1 | −12.9 | −12.8 |

*Zeta Potential is determined with Zeta Plus, Zeta Potential Analyzer by Brookhaven Instrument Corp. NY Example 5

Physical Properties of Treated Colored Pigments Dispersion in Aqueous Media

Three different reactor configurations were utilized to produce the surface modified colored pigments shown in Table 3. The accelerating aging test of those pigments in aqueous dispersions at 10% solids is shown in Table 4, mean volume particle size were expressed in micron-meter.

Pigment 5.1 was produced in a 4 L Tilt-U-Max Mixer (available from Processall Cincinnati, Ohio) and utilized 350 g of colored pigment PB15:4, 125 g of p-amino-benzoic acid (available from Aldrich Chemical, Milwaukee, Wis.), 41 g of 70% nitric acid (available from Aldrich Chemical, Milwaukee, Wis.), and 700 g of DI water. The material was mixed and maintained at a temperature of 55 to 70° C. Sodium nitrite solution (314 g of solution at 20% sodium nitrite) was introduced over a period of 30 minutes. The reaction is allowed to continue over additional 3 hrs. The product was then diluted down, pH adjusted, ultrafiltered for impurity removal centrifuged and filtered to produce the pigment dispersion designated as Pigment 5.1

Pigment 5.2 was produced in an analogous way to Example 2, except the pigment type was PY74 (pigment yellow 74, available from Sun Chemical, Cincinnati, Ohio) and the treatment level was 1.2 mol/kg of sulfanilic acid.

Pigment 5.3 was produced as described in Example 1, except the treatment level of the pigment was raised to 1.8 mol/kg of sulfanilic acid.

TABLE 3

|  |  | Pigment 5.1 | Pigment 5.2 | Pigment 5.3 |
|---|---|---|---|---|
| Pigment Type |  | PB15:4 | PY74 | PR122 |
| Treatment Type |  | p-amino-benzoic acid | Sulfanilic acid | Sulfanilic Acid |
| Treatment Level | mol/kg | 2.6 | 1.2 | 1.8 |
| Reactor Type |  | Processall | Rotor Stator | Microfluidizer |
| % solids | % | 10.5 | 10 | 9.7 |
| Viscosity | cP | 1.59 | 2.02 | 2.09 |
| pH |  | 7.6 | 8.05 | 5.29 |
| Surface Tension | dynes/cm | 70.3 | 70.6 | 70.3 |
| Mean volume Particles Size |  |  |  |  |
| MV | microns | 0.0853 | 0.1674 | 0.123 |
| 50% | microns | 0.0807 | 0.1708 | 0.0981 |
| 100% | microns | 0.2044 | 0.4088 | 0.4088 |
| AccuSizer |  |  |  |  |
| >1 microns | #/ml disp at 10% | 1.40E + 07 | 1.50E + 07 | 7.70E + 06 |
| >0.5 microns | #/ml disp at 10% | 1.10E + 08 | 2.70E + 08 | 2.50E + 08 |
| Filterability |  | filtered | — | filtered |

TABLE 4

| Description | UPA | Initial | 1 Week | % Change | 2 Week | % Change |
|---|---|---|---|---|---|---|
| Pigment 5.1 | mV | 0.0853 | 0.0815 | −4 | 0.0796 | −7 |
|  | 50% | 0.0807 | 0.075 | −7 | 0.0793 | −2 |
|  | 100% | 0.2044 | 0.2044 | 0 | 0.2044 | 0 |
|  | pH | 7.6 | 7 | −8 | 6.97 | −8 |
|  | >1.0 microns | 1.40E+07 | 1.30E+07 | −7 | 1.90E+07 | 36 |
|  | >0.5 microns | 1.10E+08 | 1.60E+08 | 45 | 4.80E+08 | 336 |
| Pigment 5.2 | mV | 0.1674 | 0.1546 | −8 | 0.1788 | 7 |
|  | 50% | 0.1708 | 0.1593 | −7 | 0.1711 | 0 |
|  | 100% | 0.4088 | 0.4088 | 0 | 0.4861 | 19 |
|  | pH | 8.05 | 6.3 | −22 | 7.25 | −10 |
|  | >1.0 microns | 1.50E+07 | 2.50E+07 | 67 | 3.90E+07 | 160 |
|  | >0.5 microns | 2.70E+08 | 2.30E+08 | −15 | 3.60E+08 | 33 |
| Pigment 5.3 | mV | 0.123 | 0.1116 | −9 | 0.1121 | −9 |
|  | 50% | 0.0981 | 0.1061 | 8 | 0.1058 | 8 |
|  | 100% | 0.4088 | 0.2891 | −29 | 0.3437 | −16 |
|  | pH | 5.29 | 4.4 | −17 | 4.06 | −23 |
|  | >1.0 microns | 7.70E+06 | 1.40E+07 | 82 | 1.50E+07 | 95 |
|  | >0.5 microns | 2.50E+08 | 2.70E+08 | 8 | 2.60E+08 | 4 |

Example 6

Surface Modified Organic Pigments and Ink-jet Inks with Different Treatment Levels In this example all three pigments were prepared according to the procedures described in Example 2, with the exceptions that three different treatment levels were used. All three dispersions showed good to fair stability over the accelerating aging test. The data clearly demonstrated that the present invention was able to control the number of functional groups attached to the colored pigment's surface, by varying the amount of treating agents used. Also, as can be seen from Table 5, as treatment level decreased, both yield and sodium level decreased.

TABLE 5

| Properties | Pigment 6.1 | Pigment 6.2 | Pigment 6.3 |
| --- | --- | --- | --- |
| Starting Pigment | PB 15:4 | PB 15:4 | PB 15:4 |
| Treating Agent | p-Amino-benzoic acid | p-Amino-benzoic acid | p-Amino-benzoic acid |
| Treatment Level | 2.6 mol/kg | 1.3 mol/kg | 0.65 mol/kg |
| Sodium Level of dispersion | 8500 ppm | 5000 ppm | 2500 ppm |
| Mean volume particle size | 80 nm | 84 nm | 89 nm |
| Yield | 70% | 50% | 36% |
| Properties of Ink | | | |
| OD | 0.91 | 0.99 | 1.0 |
| WF | 10 minutes | 10 minutes | <10 minutes |
| L* | 57.6 | 54.0 | 54.0 |
| a* | −23.3 | −22.5 | −21.8 |
| b* | −31.6 | −33.4 | −33.0 |

Example 7

Surface Modified Organic Pigments and Ink-jet Inks with Different Counter Ions In this example, three different organic color pigments (PB 15:4, PR 122, and PY 74) were surface modified according to the procedures described in Example 2. Sodium ions in those dispersions were exchanged as pigment dispersions passing through a column packed with potassium or ammonia activated ion exchange resin (Dowex available from Aldrich Chemical, Milwaukee, Wis.) Table 6 demonstrated that ion exchange process effectively exchanged all the sodium ions to potassium ions. Since all three type of pigments were treated with the same treatment level, the sulfur number indicated the attachment level varied with pigment. This difference in attachment efficiency is attributed to the inherently different molecular structure of the pigments and the available surface area that were accessible for treatment. Table 7 shows that ion exchange process can be used to exchange one type of ion to other ions in order to enhance certain properties, eg., waterfastness and optical density.

TABLE 6

| Surface modified Pigment | Before Ion-Exchange (µmol/g) | | | After Ion-Exchange (µmol/g) | | |
| --- | --- | --- | --- | --- | --- | --- |
| | Na | K | S | Na | K | S |
| PB 15:4 | 391 | 2 | 406 | 4 | 385 | 344 |
| PR 122 | 174 | 1 | 131 | 5 | 146 | 156 |
| PY74 | 110 | <1 | 106 | 1 | 105 | 103 |

TABLE 7

| Properties | Pigment 7.1 | Pigment 7.2 |
| --- | --- | --- |
| Starting Pigment | PB 15:4 | PB 15:4 |
| Treating Agent | p-Amino-benzoic acid | p-Amino-benzoic acid |
| Counter Ions | Na | $NH_4$ |
| Properties of Ink | | |
| OD | 0.91 | 0.99 |
| WF | 10 minutes | 5 minutes |
| L* | 57.6 | 55.0 |
| a* | −23.3 | −23.3 |
| b* | −31.6 | −32.8 |

Example 8

Surface Modified Color Pigments with Dual Treating Agents

The diazonium salt of 3,5-bis(trifluoromethyl)aniline (BTFMA) (available from Aldrich Chemical, Milwaukee, Wis.) was prepared by adding 2.18 g of BTFMA to 13.0 g of concentrated sulfuric acid (available from Aldrich Chemical, Milwaukee, Wis.) containing 0.655 g sodium nitrite over a 30 minute period at 40° C. The preformed diazonium mixture was added over a 15 minute period to 500 g of 9.4% pigment dispersion (PB 15:4) prepared in Example 2. The reaction mixture was maintained at 60° C. for 3 hrs. The product was then filtered, pH adjusted, ultrafiltered, polished filtered and dried down. The dried pigment was then Soxhlet extracted with THF for two days and subsequently analyzed for % F. The % F of the final product was 1.1%. Table 8 shows the physical properties of the aqueous dispersion made in this example.

TABLE 8

| | Pigment 8.1 |
| --- | --- |
| Pigment Type | PB15:4 |
| Treatment Type | PABA/BTFMA |
| % solids | 11 |
| Surface Tension (dynes/cm) | 61 |
| pH | 7.3 |
| Viscosity (cP) | 2.09 |
| Mean Particle Size (microns) | 0.087 |

Example 9

Organic Pigment and Ink-jet Ink Modified with Dye Molecules

In this example direct blue 71 (a blue dye available from Aldrich Chemical, Milwaukee, Wis.) was used to modified pigment blue 15:4 in accordance with the procedures described in Example 2. The dispersion was then formulated into ink jet ink and the printing properties were obtained. It was obvious from Table 9 that attaching dye molecules can vary the color space of pigments. Obviously, one can achieved similar results by mixing pigments with dyes. However, the present invention can provide improved properties, e.g. formulation flexibility to the end users.

TABLE 9

| Properties | Pigment 9.1 | Pigment 9.2 | Pigment 9.3 |
|---|---|---|---|
| Properties of Dispersion | | | |
| Starting Pigment | PB 15:4 | PB 15:4 | Direct Blue Dye |
| Treating Agent | Direct Blue 71 | p-Amino-benzoic acid | — |
| Mean Particle Size | 210 nm | 80 nm | — |
| Yield | — | 50% | — |
| Properties of Ink | | | |
| OD | 0.90 | 0.91 | 0.83 |
| WF | >1 hour | 10 minutes | — |
| L* | 43.4 | 57.6 | 43.0 |
| a* | −5.5 | −23.3 | 11.7 |
| b* | −33.4 | −31.6 | −15.0 |

Example 10

Ink-Jet Inks Prepared from Surface Modified Pigment with Different Purity Levels In this example, a surface modified organic pigment was prepared according to the procedures in Example 2. Two samples were obtained during the ultra-filtration step, one was after ten volumes and the other was after 20 volumes of filtration. The impurity level did impact the printing properties of those pigment dispersions. For example, OD, WF, and color were all improved when impurities were removed.

TABLE 10

| Properties | Pigment 10.1 | Pigment 10.2 |
|---|---|---|
| Starting Pigment | PB 15:4 | PB 15:4 |
| Treating Agent | p-Amino-benzoic acid | p-Amino-benzoic acid |
| Dia-filtration Volume | 10 | 20 |
| Properties of Ink | | |
| OD | 0.94 | 1.00 |
| WF | 60 minutes | 10 minutes |
| L* | 55.2 | 54.6 |
| a* | −24.5 | −18.7 |
| b* | −26.6 | −34.9 |

Example 11

Compatibility of Surface Modified Colored Pigments with an Organic Solvent

The pigments described in example 5 were used to prepare solutions that contained 5% pigment, 10% 2-pyrrolidone and 85% DI water. These samples were then subjected to elevated temperature of 70° C. over a period of two weeks as shown in Table 11. In addition these samples were also subjected to a freeze/thaw cycles as shown in Table 12. The particle sizes of the colored pigment were substantially unchanged following these tests. (Particle sizes were expressed in micron-meter.)

TABLE 11

| Description | UPA | Initial | 1 Week | % Change | 2 Week | % Change |
|---|---|---|---|---|---|---|
| Pigment 5.1 | MV | 0.0879 | 0.0848 | −4 | 0.0848 | −4 |
| | 50% | 0.0805 | 0.0764 | −5 | 0.0755 | −6 |
| | 100% | 0.2431 | 0.2431 | 0 | 0.289 | 19 |
| | >1.0 microns | 1.30E+07 | 1.30E+07 | 0 | 1.60E+07 | 23 |
| | >0.5 microns | 9.90E+07 | 1.10E+08 | 11 | 1.40E+08 | 41 |
| Pigment 5.2 | MV | 0.1724 | 0.1825 | 6 | 0.1718 | 0 |
| | 50% | 0.1691 | 0.1721 | 2 | 0.1591 | −6 |
| | 100% | 0.4088 | 0.4861 | 19 | 0.5781 | 41 |
| | >1.0 micrnns | 1.30E+07 | 1.90E+07 | 46 | 1.30E+07 | 0 |
| Pigment 5.3 | >0.5 microns | 2.20E+08 | 1.90E+08 | −14 | 2.50E+08 | 14 |
| | MV | 0.1146 | 0.1069 | −7 | 0.1102 | −4 |
| | 50% | 0.1088 | 0.0964 | −11 | 0.1045 | −4 |
| | 100% | 0.2891 | 0.3437 | 19 | 0.2891 | 0 |
| | >1.0 microns | 1.10E+07 | 1.40E+07 | 27 | 1.20E+07 | 9 |
| | >0.5 microns | 2.60E+08 | 2.70E+08 | 4 | 3.60E+08 | 38 |

TABLE 12

| Description | UPA | Initial | 1st Cycle | % Change | 2nd Cycle | % Change |
|---|---|---|---|---|---|---|
| Pigment 5.1 | MV | 0.0879 | 0.0863 | −2 | 0.0843 | −4 |
| | 50% | 0.0805 | 0.079 | −2 | 0.0784 | −3 |
| | 100% | 0.2431 | 0.2044 | −16 | 0.2431 | 0 |
| Pigment 5.2 | MV | 0.1724 | 0.1715 | −1 | 0.1687 | −2 |
| | 50% | 0.1691 | 0.1695 | 0 | 0.1508 | −11 |
| | 100% | 0.4088 | 0.4088 | 0 | 0.4088 | 0 |
| Pigment 5.3 | MV | 0.1146 | 0.0998 | −13 | 0.1117 | −3 |
| | 50% | 0.1088 | 0.1032 | −5 | 0.1025 | −6 |
| | 100% | 0.2891 | 0.2431 | −16 | 0.2891 | 0 |

Example 12

Surface Modified Organic Pigment Dispersions and Ink-jet Inks with the Mixture of Two Surface Modified Pigments Pigment 12.1 was prepared in an analogous way to Pigment 5.1. Pigment 12.2 was prepared according to the procedure described in Example 1. Generic inks were made from Pigments 12.1 and 12.2. Print properties of the inks were compiled in Table 13. Pigment 12.3 was a 1:1 mixture of the inks of Pigment 12.1 and Pigment 12.2. Color space of the mixed pigment (Pigment 12.3) was a combination of the individual pigment color properties (Pigment 12.1 and 12.2).

TABLE 13

|  | Pigment 12.1 | Pigment 12.2 | Pigment 12.3 |
|---|---|---|---|
| Pigment Type | PB15:4 | PB60 | Mixture 50/50 |
| Treatment Type | PABA | Sulfanilic Acid | — |
| Reactor | Processall | Microfluidizer | — |
| Mean volume Particle Size (microns) | 0.085 | 0.033 | — |
| OD | 0.94 | 0.9 | 0.93 |
| L | 55 | 47.2 | 49.4 |
| A* | −24.5 | 2.5 | −7.6 |
| B* | −26.6 | −29.1 | −31.6 |

Example 13

Ion Exchange Process Can Effectively Remove Soluble Di-valent Ions

The presence of di-valant ions, e.g. calcium, iron, magnesium, in the pigment dispersion was not favorable for some applications. Some of those ions came with pigment and some of them may have been introduced by the present invention. Since the present invention made pigment dispersible in water, soluble portions all those ions (some might be embedded in the crystal structure) can be removed effectively by ion-exchange process. In this example, a surface modified pigment prepared according to the procedures in Example 2 was ion exchanged according to example 7. The ion percentage before and after ion exchange was illustrated in Table 14. The following table clearly illustrated the above points.

TABLE 14

| Di-valance Ions | Pigment 13.1 | Pigment 13.2 Na ion exchanged of pigment 13.1 |
|---|---|---|
| % Calcium | 940 ppm | <80 ppm |
| % Iron | 130 ppm | <80 ppm |
| % Magnesium | 280 ppm | <80 ppm |

Example 14

LF Properties of Surface Modified Organic Pigments

One of the more important properties of organic pigments is lightfastness. This example shows that the present invention did not alter that property. In this example, pigment 14.1 (PB 15:4) was prepared according to the method in Example 2, and pigment 14.2 (PR 122) was prepared in Example 1. These pigment dispersions were then formulated into ink-jet inks. Prints from those inks were then exposed to UV light for three weeks. The color difference between prints prior and after the exposure was compared and tabulated in Table 15. As can be seen the lightfastness properties of the original pigments have not been changed.

TABLE 15

|  | Pigment 14.1 PB 15:4 | Pigment 14.2 PR 122 |
|---|---|---|
| OD (Before/after) | 0.94/0.98 | 0.96/0.93 |
| L (Before/after) | 55.2/56.7 | 54.2/55.7 |
| a* (before/after) | −24.5/−25.5 | 44.0/40.4 |
| b* (before/after) | −26.6/−25.4 | −11.6/−5.3 |
| <E*ab | 2.2 | 7.5 |

Example 15

No Dyelike Molecules in Pigment Dispersion Products

When enough soluble groups, for example, benzenesulfonic acid groups, attach to a surface pigment molecule, the molecule can be converted into a soluble substance that will dissolved into media as a dye-like molecule. Media soluble small molecules or aggregates were not observed during ultra-filtration or dialysis. When the surface modified pigments in Example 5 were dialyzed using 50,000 molecular weight cut-off membranes (Spectra/Por, available from VWR, Willard, Ohio), no colored substance leaked out. It was concluded that the color properties of those dispersions came only from surface modified pigment particles and that there are no dye-like molecules present in the products.

Example 16

Other Modified Colored Pigments

Table 16 shows physical property data of aqueous dispersion of sulfanilic acid surface modified colored pigments of PV19 (available from Sun Chemical, Cincinnati, Ohio), PR254 (available from Ciba Chemical, Newport, Del.) and PY151 (available from Clariant, Coventry, R.I.). These treatments were treated in a similar manner to that described in Example 1. All those pigment dispersions showed good stability characteristic over two weeks of accelerating aging test. Clearly, the present invention is broadly applicable and covers a wide range of pigment classes.

TABLE 16

|  | Pigment 15.1 | Pigment 15.2 | Pigment 15.3 |
|---|---|---|---|
| Pigment Type | V19 | PR254 | PY151 |
| Treatment Type | Sulfanilic Acid | Sulfanilic Acid | Sulfanilic Acid |
| Reactor | High pressure homogenizer | High pressure homogenizer | High pressure homogenizer |
| Particle Size (microns) | 0.159 | 0.182 | 0.122 |

The foregoing description of preferred embodiments of the present invention has been presented for purposes of illustration and description. It is not intended to be exhaustive or to limit the present invention to the precise form disclosed, and modifications and variations are possible in light of the above teachings, or may be acquired from practice of the present invention. The embodiments were chosen and described in order to explain the principles of the invention and its practical application to enable one skilled in the art to utilize the present invention in various embodiments and with various modifications as are suited to the particular use contemplated. It is intended that the scope of the present invention be defined by the claims appended hereto, and their equivalents.

What is claimed is:

1. An ink jet ink comprising a) at least one liquid vehicle and b) colored pigments comprising at least one of the following characteristics:

a) an accusizer number of less than $10^{10}$ particles/ml of dispersion at 15% solids which are greater than 0.5 micron;

b) a filterability such that when in a liquid medium, 100 ml and 10% solids of the colored pigment filters through a 3 micron nylon absolute filter;

c) a colored pigment purity of greater than about 80%, based on extractable material; and/or d) a stability such that the above-described properties do not change by more than 50% at 25 degrees C. for one week;

wherein each of the characteristics is based on colored pigments in an aqueous or non-aqueous media having no added external dispersant present, and wherein the colored pigment is a pigment other than carbon black.

2. The ink jet ink of claim 1, wherein said colored pigments have attached at least one organic group.

3. The ink jet ink of claim 1, wherein said colored pigment is a blue, brown, cyan, green, violet, magenta, red, orange, or yellow pigment or mixtures thereof.

4. Colored pigments comprising at least one of the following characteristics:
   a) an accusizer number of less than $10^{10}$ particles/ml of dispersion at 15% solids which are greater than 0.5 micron;
   b) a filterability such that when in a liquid medium, 100 ml and 10% solids of the colored pigment filters through a 3 micron nylon absolute filter;
   c) a colored pigment purity of greater than about 80%, based on extractable material; and/or
   d) a stability such that the above-described properties do not change by more than 50% at 25 degrees C. for one week;

wherein each of the characteristics is based on colored pigments in an aqueous or non-aqueous media having no added external dispersant present, and wherein the colored pigment is a pigment other than carbon black.

5. The colored pigments of claim 4, wherein said colored pigments have attached at least one organic group.

6. The colored pigments of claim 4, wherein said organic group comprises a) at least one aromatic group, at least one $C_1$–$C_{20}$ alkyl group, or mixtures thereof.

7. The colored pigments of claim 6, wherein said organic group further comprises at least one ionic group, ionizable group, nonionic group, or mixtures thereof.

8. The colored pigments of claim 1, wherein said colored pigment is a blue, brown, cyan, green, violet, magenta, red, orange, or yellow pigment or mixtures thereof.

9. The colored pigments of claim 7, wherein said organic group further comprising at least one ionic group and at least one counterionic group.

10. The colored pigments of claim 9, wherein said counterionic group comprises at least one dye.

11. A process for preparing surface-modified colored pigments comprising combining at least one treating agent and at least one type of colored pigment(s) in a container to form a mixture and subjecting the mixture to high shearing and introducing at least one diazotizing agent to the mixture at least for a portion of time while the high shearing is taking place such that a reaction product is formed and contains surface-modifed colored pigment(s).

12. The process of claim 11, wherein at least one dizaotizing agent is added continuously while the high shearing is taking place.

13. The process of claim 11, wherein said diazotizable agent has an organic group comprising: a) at least one aromatic group or at least one $C_1$–$C_{20}$ alkyl group, and b) at least one ionic group, ionizable group, nonionic group, or mixtures thereof.

14. The process of claim 11, wherein said diazotizing agent is ammonium nitrite, butyl nitrite, dicyclohexylammonium nitrite, ethylnitrite, isoamylnitrite, lithium nitrite, sodium nitrite, potassium nitrite, zinc nitrite, or mixtures thereof.

15. The ink jet ink of claim 1, wherein said colored pigments further comprise a particle size distribution of from about 10 nm to about 300 nm.

16. The colored pigments of claim 4, further comprising a particle size distribution of from about 10 nm to about 300 nm.

* * * * *